(12) United States Patent
Balin et al.

(10) Patent No.: US 12,216,805 B2
(45) Date of Patent: Feb. 4, 2025

(54) MONITORING FILE SHARING COMMANDS BETWEEN NETWORK EQUIPMENT TO IDENTIFY ADVERSE CONDITIONS

(71) Applicant: Dell Products, L.P., Round Rock, TX (US)

(72) Inventors: Maxim Balin, Yavne (IL); Tomer Shachar, Omer (IL); Yevgeni Gehtman, Modi'in (IL)

(73) Assignee: DELL PRODUCTS L.P., Round Rock, TX (US)

( * ) Notice: Subject to any disclaimer, the term of this patent is extended or adjusted under 35 U.S.C. 154(b) by 288 days.

(21) Appl. No.: 17/721,184

(22) Filed: Apr. 14, 2022

(65) Prior Publication Data

US 2023/0334185 A1    Oct. 19, 2023

(51) Int. Cl.
| | |
|---|---|
| *G06F 21/78* | (2013.01) |
| *G06F 21/31* | (2013.01) |
| *G06F 21/55* | (2013.01) |
| *G06F 21/62* | (2013.01) |
| *H04L 67/1097* | (2022.01) |

(52) U.S. Cl.
CPC ............ *G06F 21/78* (2013.01); *G06F 21/31* (2013.01); *G06F 21/556* (2013.01); *G06F 21/6218* (2013.01); *H04L 67/1097* (2013.01)

(58) Field of Classification Search
CPC ........ G06F 21/78; G06F 21/31; G06F 21/556; G06F 21/6218; G06F 21/554; H04L 67/1097
USPC .......................................................... 726/26
See application file for complete search history.

(56) References Cited

U.S. PATENT DOCUMENTS

| | | | | |
|---|---|---|---|---|
| 2013/0227714 A1* | 8/2013 | Gula | ................... | H04L 63/1408 726/32 |
| 2019/0379736 A1* | 12/2019 | Kravtsov | ................ | H04L 67/06 |

* cited by examiner

*Primary Examiner* — Tan Doan
(74) *Attorney, Agent, or Firm* — Amin, Turocy & Watson, LLP

(57) ABSTRACT

The technologies described herein are generally directed toward monitoring file sharing commands between network equipment to identify adverse conditions. According to an embodiment, a system can comprise a processor and a memory that can enable performance of operations including monitoring resource sharing communication between first network equipment and second network equipment via a network. In one or more embodiments, the method can additionally include based on the resource sharing communication, detecting a condition of the resource sharing communication that has a likelihood of indicating a defined adverse event that has at least a threshold likelihood. Further, the method can include, but are not limited to, in response to detecting the condition, facilitating suspending the resource sharing communication between the first network equipment and the second network equipment.

20 Claims, 11 Drawing Sheets

MONITORING FILE SHARING COMMANDS BETWEEN NETWORK EQUIPMENT TO IDENTIFY ADVERSE CONDITIONS

BACKGROUND

Modern data storage computer systems can facilitate the storage and manipulation of data by a variety of different network equipment. Data may be stored on a network storage component, which may be referred to as a storage, and which may comprise a hard drive, a magnetic media drive, a solid-state drive, a memory, and the like. Manipulation may refer to one or more actions performed to a storage unit, such as a file, or files, which actions may comprise reading, writing, copying, moving, deleting, and the like. Problems can occur when malware secretly controls operation of otherwise authorized data manipulation equipment, which may include a legitimate user's computer that has legitimate access to the storage. In some circumstances, combinations of different file sharing commands can be used to cause adverse events on storage equipment. For example, file read instructions, or commands, can be used by malware, along with removal instruction, or commands, to obtain unauthorized access to data of an organization stored on a network storage. These problems can be further exacerbated when data is stored and accessed within, or from, a cloud-based environment.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to monitor, by security equipment comprising a processor, resource sharing activity that may have been caused by communication between first network equipment and second network equipment via a network. The resource sharing activity communication may comprise access activity related to one or more storage units corresponding to a network storage. A storage unit may comprise a file, a folder, a volume, a drive, and the like. The instructions may include an instruction to, based on the resource sharing activity, detect, by the security equipment, a condition of the that that has a likelihood of indicating a defined adverse event that has at least a threshold likelihood. Further, the instructions can include an instruction to, in response to detecting the condition, facilitate, by the security equipment, suspending resource sharing activity communication between the first network equipment and the second network equipment.

An example method can comprise monitoring, by security equipment comprising a processor, resource sharing activity that may have resulted from communication between first network equipment and second network equipment via a network. The method can further include, based on the resource sharing activity, detecting, by the security equipment, a condition of the resource sharing activity that has a likelihood of indicating a defined adverse event that has at least a threshold likelihood. Further, the method can include, in response to detecting the condition, facilitating, by the security equipment, suspending the resource sharing activity between the first network equipment and the second network equipment.

An example non-transitory computer-readable medium can comprise instructions that, in response to execution, cause a system comprising a processor to perform operations. These operations can comprise monitoring, by security equipment comprising a processor, resource sharing activity that may have resulted from communication between first network equipment and second network equipment via a network. The operations can further include, based on the resource sharing communication, detecting, by the security equipment, a condition of the resource sharing activity that has a likelihood of indicating a defined adverse event that has at least a threshold likelihood. Further, the method can, in response to detecting the condition, facilitate, by the security equipment, suspending the resource sharing activity between the first network equipment and the second network equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage, such as unauthorized appropriation of data stored to a data store occurs. A data store, such as a hard drive, a magnetic disc drive, a solid-state drive, a memory, and the like, may be referred to as a storage, and may be implemented as a storage that is accessible to multiple computing device. A storage may be a cloud storage that is accessible by multiple computing devices via a network.

One having skill in the relevant art(s), given the description herein, appreciate that different types of malware and other adverse conditions can be handled in some circumstances, including, but not limited to, ransomware, file tampering, denial of service attacks, and data leakage. For example, in one or more embodiments, the resource sharing can be combination of commands issued by the first network equipment that improperly accesses resources stored by the second network equipment, e.g., a data leakage attack. Additional illustrative examples are provided below.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
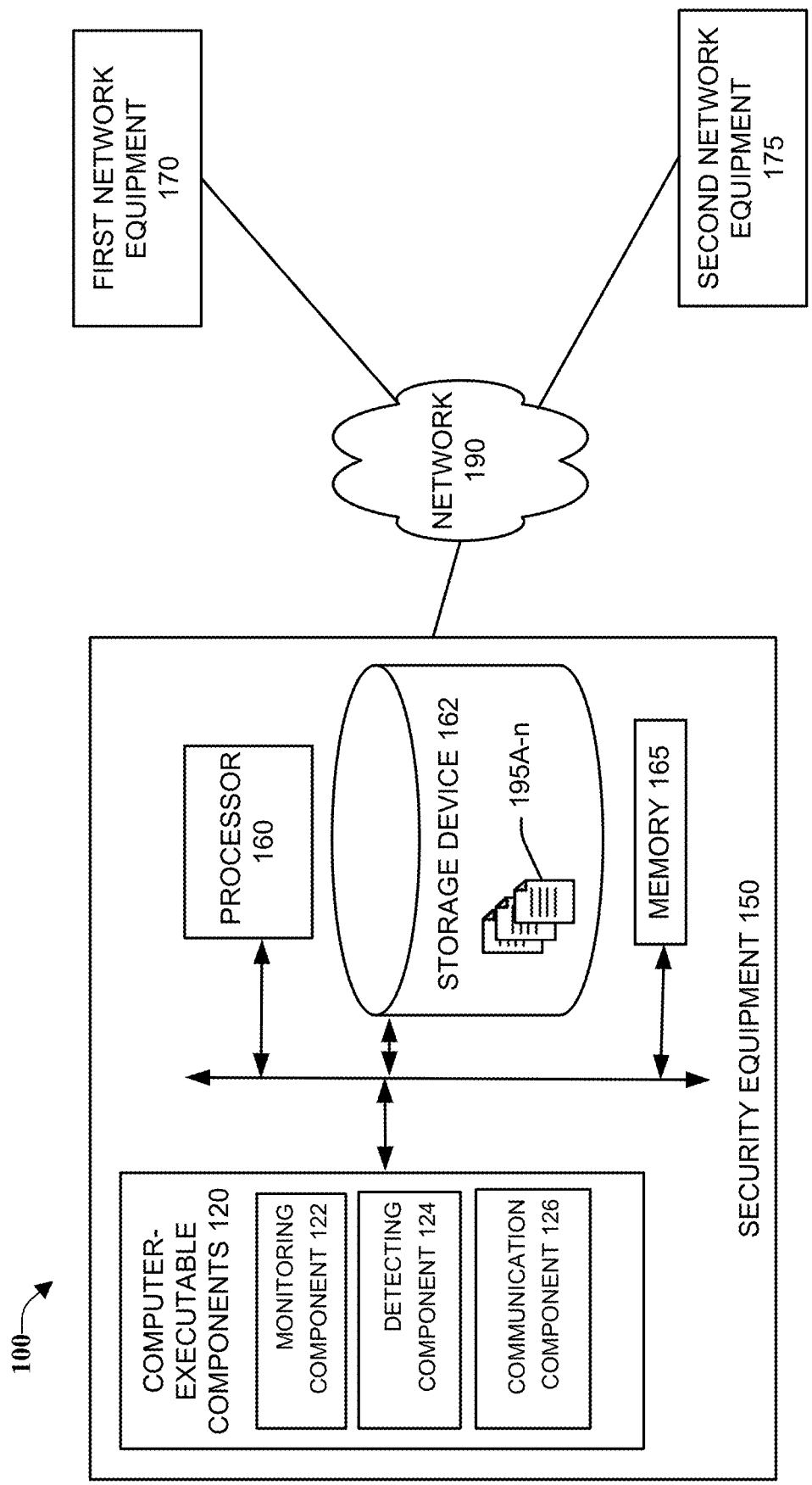
FIG. 1 is an architecture diagram of an example system that can facilitate monitoring file sharing commands between network equipment to identify adverse conditions, in accordance with one or more embodiments.

FIG. 1 is an architecture diagram of an example system 100 that can facilitate monitoring file sharing commands, such as read commands or copy commands, for example commands sent between network equipment, to identify adverse conditions, in accordance with one or more embodiments. For purposes of brevity, description of like elements and/or processes employed in other embodiments is omitted. As depicted, system 100 includes security equipment 150 connected to, or communicatively coupled with, first network equipment 170 and second network equipment 175 via network 190. According to multiple embodiments, security equipment 150 may include memory 165 that can store one or more computer and/or machine readable, writable, and/or executable components 120 and/or instructions. Security equipment may comprise a computer service and may be referred to as a cloud storage service. Network 190 may comprise multiple networks, such as an enterprise's private network, a public communication network such the Internet, an individual's home computing network corresponding to firewall, router, or switch, or a wireless communication network such as a 4G or 5G network, and the like.

In embodiments, security equipment 150 can further include processor 160 and storage device 162. In one or more embodiments, computer-executable components 120, when executed by processor 160, can facilitate performance of operations defined by the executable component(s) and/or instruction(s). Computer executable components 120 can include monitoring component 122, detecting component 124, communication component 126, and other components described or suggested by different embodiments described herein, that can improve the operation of system 100. As discussed further below, storage device 162 can include device activity profiles 195A-n, which may correspond to activity patterns relative to a network storage (which may be different storage than storage device 162) that has been deemed 'normal' (e.g., activity typically associated with normal human activity in accessing files stored in a network storage).

It will be appreciated that in some examples of embodiments, communication between data manipulating equipment (e.g., first network equipment 170) and data storage equipment (second network equipment 175) may comprise server message block ("SMB") communication messages. It will also be appreciated that in one or more embodiments other communications protocols may provide similar means for facilitating activity between similarly arranged network equipment.

In some embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

It will be appreciated that the computer processing systems, computer-implemented methods, apparatus, and computer program products described herein may employ computer hardware and/or software to solve problems that are highly technical in nature (e.g., rapidly evaluating network command activity and controlling communication among devices in different contexts), that are not abstract and cannot be performed as a set of mental acts by a human. For example, a human, or even a plurality of humans, cannot apply criteria to activity of network equipment or a network storage and provide a corrective mitigating action in a timely manner as can various embodiments described herein. Embodiments described herein may enhance the functionality of computing systems and network themselves In one or more embodiments, memory 165 can store computer and/or machine readable, writable, and/or executable components 120 and/or instructions that, when executed by processor 160, can facilitate execution of the various functions described herein relating to monitoring component 122, detecting component 124, communication component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of monitoring component 122, which can in some implementations, monitor resource sharing communication between network equipment via a network. As discussed with FIGS. 3-5 below, one or more embodiments can monitor (e.g., by security equipment 150), resource sharing communication between first network equipment 170 and second network equipment 175 via a network.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of detecting component 124, which in some implementations can, based on the resource sharing communication, detect or determine, by security equipment 150, a condition of the resource sharing communication that has a likelihood of indicating a defined adverse event, such as data leakage, that has at least a threshold likelihood. As discussed with FIGS. 3-5 below, one or more embodiments can, based on the resource sharing communication, detect, by security equipment 150, a condition of the resource sharing communication (e.g., activity that deviates from a profile associated with first network equipment 170) that has a likelihood of indicating a defined adverse event (e.g., data leakage from first network equipment 170) that has at least a threshold likelihood. A data leakage attack may be implemented by a process based on, for example, accessing files according to a repeated pattern, accessing files during similar periods of time from one day to the next, or a "tear drop" process (i.e., accessing a small number of files during each of multiple attack events or attempts).

Use of predefined templates, or determined normal access activity patterns, may reduce false positive determinations. A defined template representing a normal pattern of behavior of data access may facilitate not determining access activity as being an attack as compared to using a determined value of access activity, (e.g., a defined number of files read or copied for a given connect and disconnect sequence). Using a template representing normal human behavior may prevent, for example, erroneously deeming a legitimate user copying files as a data leakage attack when the given user typically copies approximately the same number of files for a given sequence of connecting and disconnecting from a network storage. Thus, a single sequence of connecting, reading/copying files, and then disconnecting may not be treated as a data leakage attack threat. On the other hand, copying a single file every hour on the hour around the clock may indicate a data leakage attack. In addition to using templates, or normal access activity patterns, to reduce false positive determinations of a data leakage attack, access by certain defined applications may be excluded from evaluating for data leakage attack determinations. For example, backup applications, document management applications, and the like may be excluded from monitoring by embodiments described herein. In addition, based on evaluating read or copy commands a determination may be made as to which files may have potentially been 'leaked' and from which computing device or network endpoint the potential data leakage attack may have originated.

As discussed further with FIGS. 3-4 below, one approach to detecting anomalous activity in commands from first network equipment 170 to second network equipment 175 is to generate activity profiles 195A-n for command issuing network equipment, e.g., activity profile/pattern 195A can be generated based on monitoring the activity of first network equipment 170 during normal, non-attack operation.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of communication component 126, which can in some implementations, in response to detecting a condition, such as a likelihood of data leakage, manage communication, such as the facilitating suspending the resource sharing activity between the first network equipment and the second network equipment. As discussed in reference to FIGS. 3-5 below, one or more embodiments can, in response to detecting the condition (e.g., potential nefarious data leakage), facilitate suspending the resource sharing activity between the first network equipment 170 and the second network equipment 175.

It is appreciated that the embodiments of the subject disclosure depicted in various figures disclosed herein are for illustration only, and as such, the architecture of such embodiments are not limited to the systems, devices, and/or components depicted therein. For example, in some embodiments, security equipment 150 can further comprise various computer and/or computing-based elements described in reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that security equipment 150 can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as security equipment 150.

Figure 2:
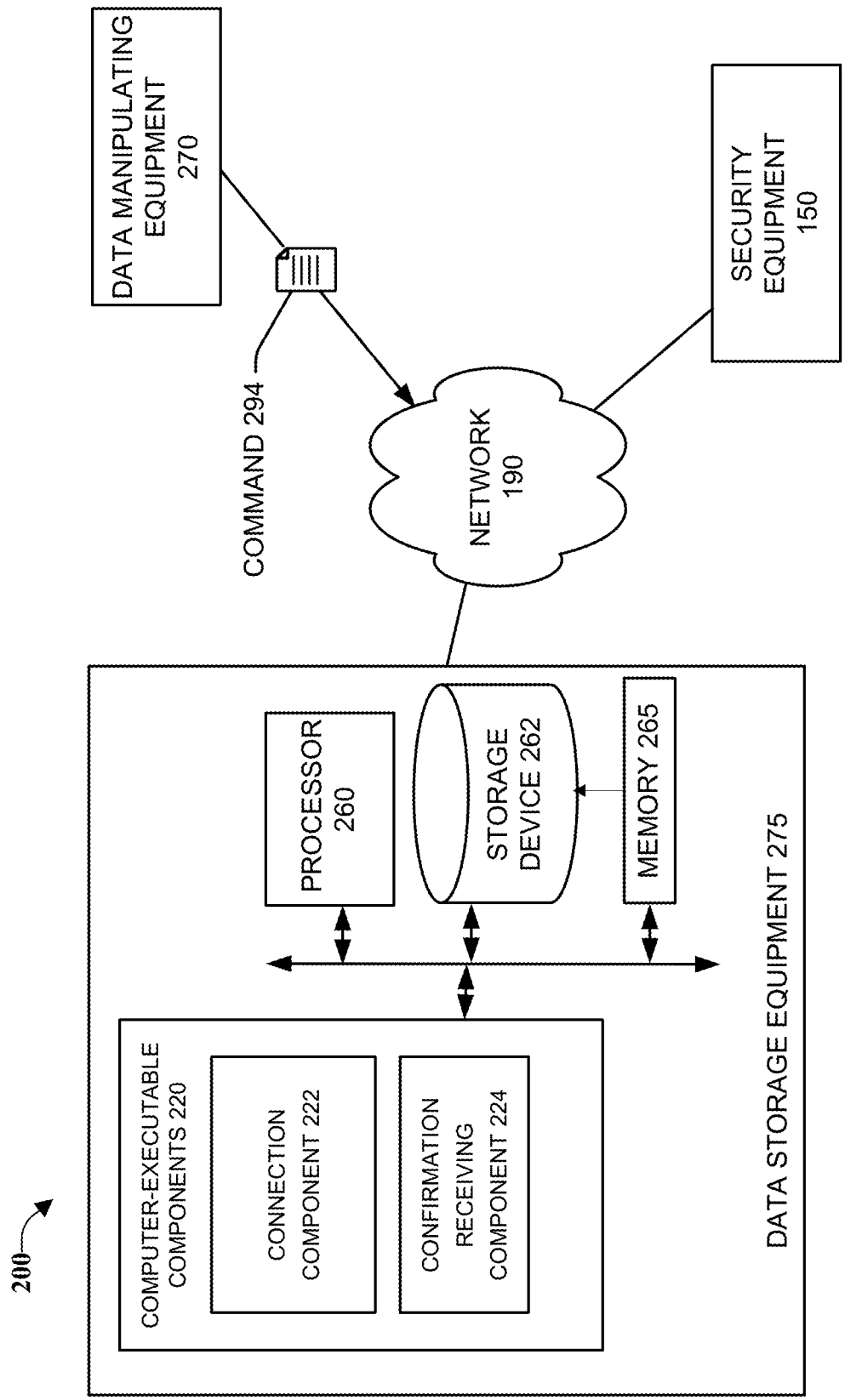
FIG. 2 is an architecture diagram of an example system that can facilitate analyzing file sharing commands issued to data storage equipment by data manipulating equipment to identify adverse conditions, in accordance with one or more embodiments.

FIG. 2 is an architecture diagram of an example system 200 that can facilitate monitoring file sharing commands, or other file manipulation commands such as copy commands or read commands, between network equipment to identify adverse conditions, in accordance with one or more embodiments. For purposes of brevity, description of like elements and/or processes employed in other embodiments is omitted. As depicted, system 200 includes network data storage equipment 275, which may be referred to as storage 275, connected to, or in communication with, data manipulating equipment, and security equipment 150 via network 190. Data manipulating equipment 270 is depicted as issuing command 294 to data storage equipment 275 via network 190. Example types of data stored at storage equipment 275 may comprise, but are not limited to, financial services equipment, healthcare and pharmaceutical equipment, intelligent connected vehicle (ICV) equipment, enterprise business records and business-related information, and telecommunications systems equipment. Data manipulating equipment 270 may comprise a computing device, such as a laptop computer, being used by a user who legitimately has access to storage 275. The data manipulating equipment may have been infected by malware that may use a communication link, channel, tunnel, bearer, or other communication connection legitimately established between the data manipulation equipment and storage 275 to obtain unauthorized access to files, folders, volumes, or other storage units stored on the network storage 275. During an unauthorized data access event data manipulation equipment 270 may send commands to network storage 275 to read, copy, download, or otherwise obtain, without authorization, files or data stored therein, from the network storage.

In embodiments, data storage equipment 275 can include processor 260 (e.g., similar to processor 160) and storage device 262, e.g., similar to storage device 162. According to multiple embodiments, data storage equipment 275 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). In embodiments, memory 265 can store one or more computer and/or machine readable, writable, and/or executable components 220 and/or instructions, which can, when executed by processor 260, facilitate performance of operations defined by the executable component including connection component 222, indication component 224, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of data storage equipment 275, memory 265 can store executable instructions that can facilitate generation of connection component 222, which in some implementations, can establish server communications with client equipment via a network. As discussed with FIGS. 3-5 below, one or more embodiments can establish server communications, via a network, with client equipment, e.g., data manipulating equipment 270.

Continuing this example implementation example, memory 265 can store executable instructions that can facilitate generation of indication receiving component 224, which in some implementations, can receive an indication that unauthorized access that may correspond to a data leakage action may have occurred with storage 275. Responsive to an indication that unauthorized activity, such as a data leakage attack, associated with storage 275 may have occurred, security equipment 150 may suspend communications between data manipulating equipment 270 and data storage equipment 275. In some implementations, security equipment 150 may perform a mitigation action, or cause a mitigation action to be performed, such as, for example, suspending the communications based on a determination of a likelihood of at least a threshold likelihood (e.g., above an estimated probability), that the communications may have comprised instructions to cause unauthorized, or malicious, access of computer files, e.g., malware instructions to implement a data leakage attack.

Figure 3:
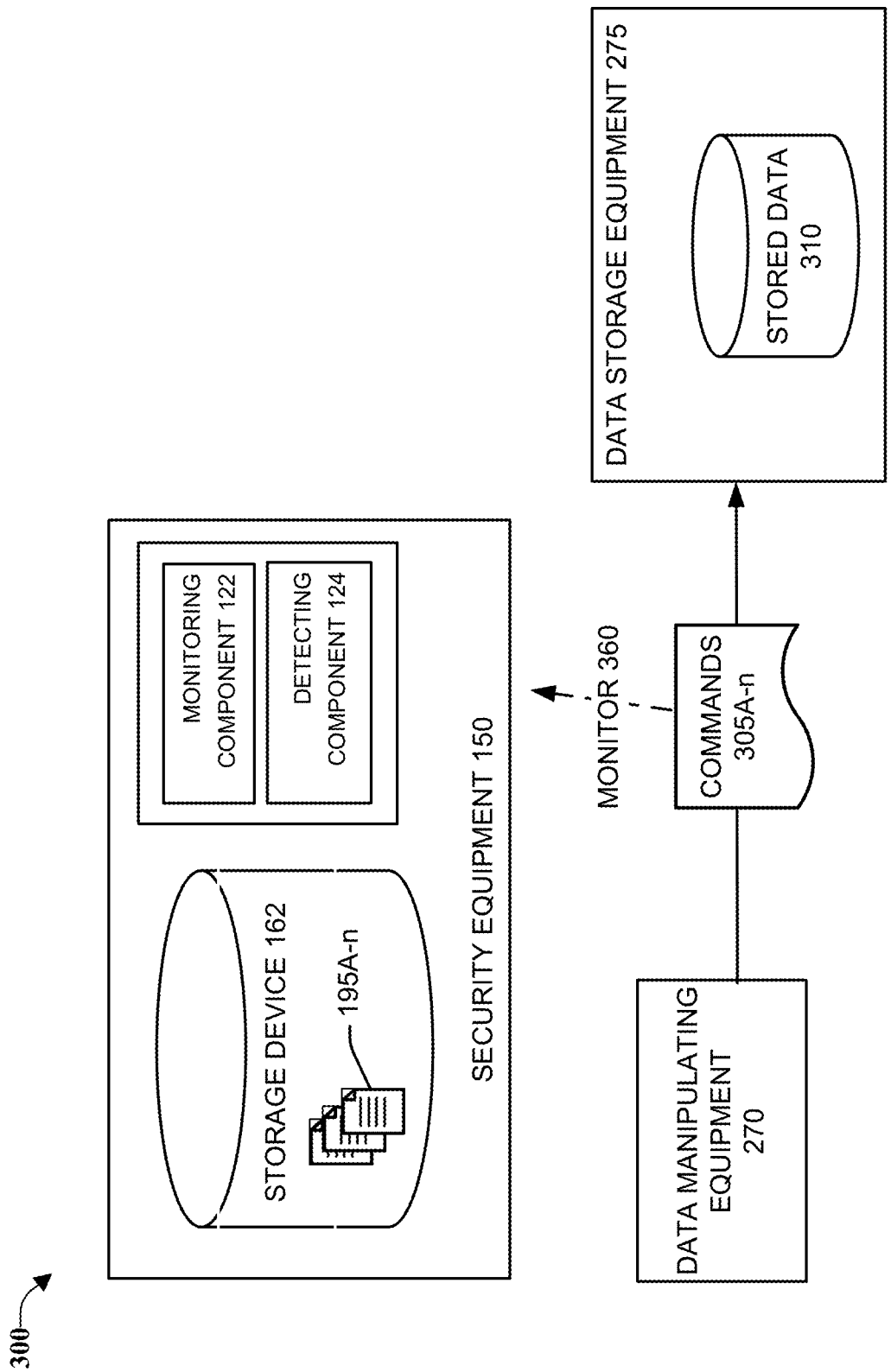
FIG. 3 is an architecture diagram of an example system that can facilitate monitoring file sharing commands between network equipment to identify adverse conditions, in accordance with one or more embodiments.

FIG. 3 is an architecture diagram of an example system 300 that can facilitate monitoring file sharing commands between network equipment to identify adverse conditions, in accordance with one or more embodiments. For purposes of brevity, description of like elements and/or processes employed in other embodiments is omitted. As depicted, system 300 includes security equipment 150 monitoring 360 the commands 305A-n issued by data manipulating equipment 270 to manipulate stored data 310 stored with data storage equipment 275. To illustrate different aspects of system 300, monitoring component 122 and detecting component 124, described in reference to FIG. 1 above, are discussed in additional detail in reference to FIG. 3. In addition, storage device 162 is included, along with stored activity profiles 195A-n, which may correspond to normal access patterns of storage 275 during periods when a data leakage attack is not occurring.

As noted above, one or more embodiments can monitor and analyze communications between data manipulating equipment 270 and data storage equipment 275 to detect particular patterns of commands that may indicate a likelihood of the operation of malware by data manipulating equipment 270, such as commands that indicate a data leakage attack. One approach to this monitoring, used by one or more embodiments, involves monitoring client devices (e.g., data manipulating equipment 270) over time to determine a baseline, which may comprise a baseline pattern of normal access of storage 275, of the resource sharing communication. One having skill in the relevant art(s), given the description herein, appreciates that this baseline can include different characteristics, including, but not limited to, characteristics of the executed data manipulation commands, e.g., the scope of executed commands, that is, the number of files typically manipulated by data manipulating equipment 270, and the type of manipulations performed, for example read actions, copy actions, or a rapid sequence of connect actions, read actions, and then disconnect actions.

In one or more embodiments, in real-time (e.g., as commands are being issued by data manipulating equipment 270) a flexible detection technique can be used to detect deviations from the baseline of that device, e.g., the 'normal behavior' of data manipulating equipment 270. For example, detection of a number of access requests and READ commands above a threshold, can be identified as an abnormal activity, e.g., a condition of the resource sharing communication from data manipulating equipment 270 that has a likelihood of indicating a defined adverse event (e.g., malware operation) that has at least a threshold likelihood of being in progress, e.g., to a confidence level or having a sufficient probability to warrant additional action. In another example, abnormal communication behavior can include a high volume of connection requests followed by different commands including, but not limited to, COPY or READ commands that access files stored at storage 275. It will be appreciated that a copy command may comprise a READ command. In addition to commands that cause activity at storage 275 of reading or copying of files, a read command may result in storage 275 generating a status message, such as 'NO MORE SUCH FILES', 'NO SUCH FILE', 'ACCESS DENIED', 'FILE IS A DIRECTORY', or other such status message that may correspond to a command requesting an action that is not normal—a human user may not typically request a read of all files in a directory, thus, when a status message is generated that there are no more files to read or copy, security equipment 150 may determine that commands requesting action at storage 275 indicate with a high level of likelihood above a determined likelihood threshold that commands 294 correspond to a data leakage attack. Accordingly, status message responses to access commands may be used in determining access command activity metrics or normal access command activity for determining a likelihood of a data leakage attack.

Figure 4:
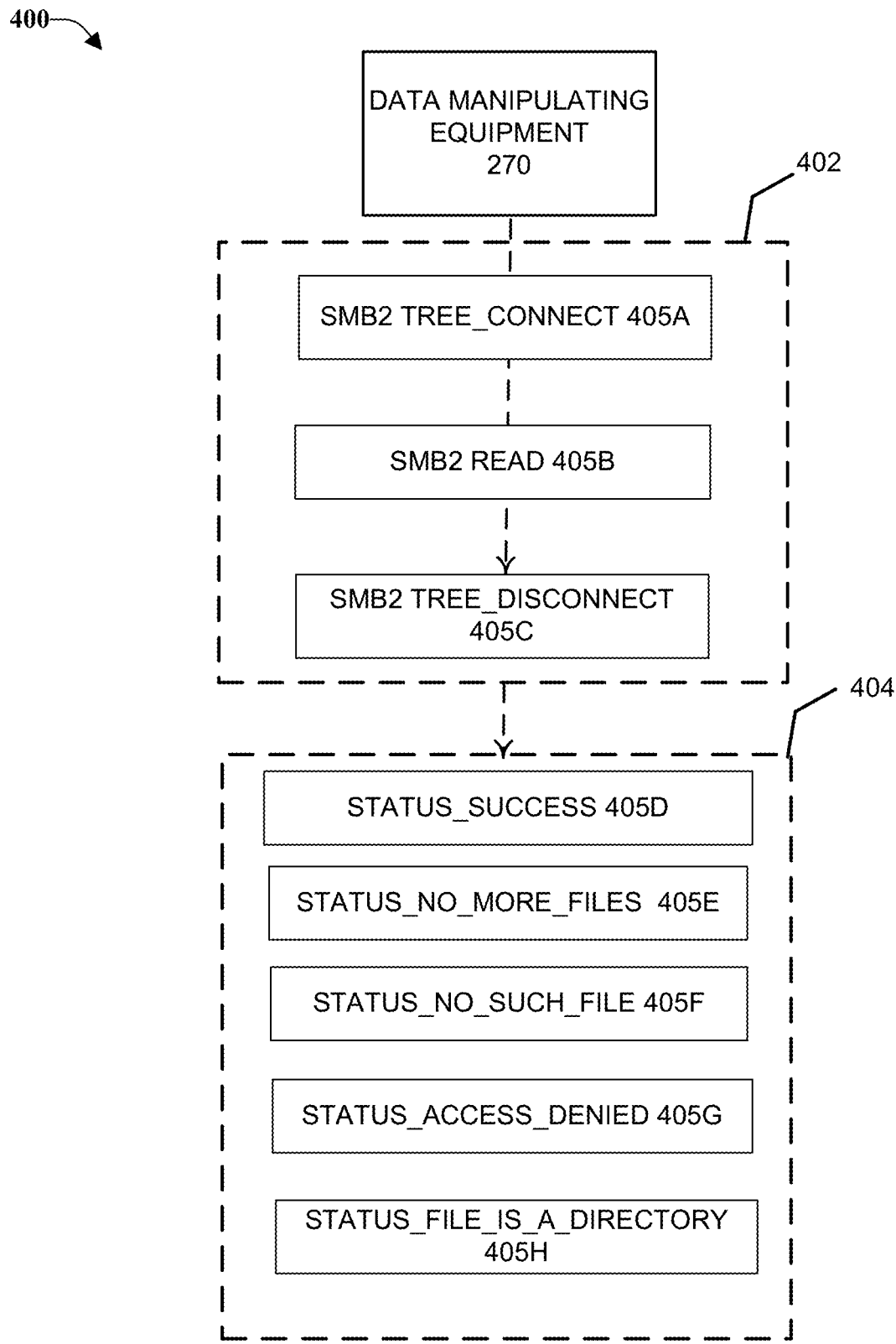
FIG. 4 depicts a diagram of an example pattern of commands that can indicate adverse conditions, in accordance with one or more embodiments.

FIG. 4 depicts a diagram of an example pattern of commands that can indicate adverse conditions, in accordance with one or more embodiments. For purposes of brevity, description of like elements and/or processes employed in other embodiments is omitted. As depicted, system 400 includes data manipulating component 270 issuing an example, non-limiting sequence of commands 402, which are shown as comprising a sequence tree connect 405A, read 405B, and tree disconnect 405C. Status response messages 404, which may be SMB messages, are shown as comprising possible responses to one or more of commands 402: Status_success 405D, status_no_more_files 405E, status_no_such_file 405F, status_access_denied 405G, and file_is_a_directory 405H. It should be noted that, as depicted in FIG. 3, and to illustrate other examples of embodiments herein, communication between data manipulating equipment 270 and data storage equipment 275 are described as utilizing commands from server message block 2.0 (SMB2) communications protocol. It will be appreciated that one or more embodiments may comprise other communications protocols that may provide similar means for facilitating the issuance of commands between similarly arranged network equipment. Thus, the command sequence 405A-C and response status messages 405 D-H listed above have a prefix SMB2 before each command. One of the ways to provide file storage service in a cloud environment is by SMB protocol usage, which can facilitate cloud-based file storage used by data manipulating equipment 270.

The following discussion provides an example combination of commands that can indicate a likelihood of data leakage attack. In this example, a tree connect 405A command is sent to data storage equipment 275 by data manipulating component 270 to request access to a particular share in stored data 310. After access is granted read 405B can be used to request either reading of a file or data contained therein, or copying a file or data contained in a file. A read command may comprise parameters that request a reading/copying of all files in a particular folder. After reading all files in a folder, a command to disconnect may be sent to storage 275 from data manipulation component 270. During reading/copying, and before storage 275 receives disconnect message 405B, the storage may generate or send a status message 404 to the data manipulation component. The status messages 404 shown in FIG. 4 may include messages that may not typically be generated and provided when a user is legitimately reading a file for use and then disconnecting. Rather, a data leakage attack may include an attempt to read, or copy, all files from a directory and when all files have been read storage 275 may generate a status message 404 notifying data manipulation component 270 that there are no more files. A status response to a request of a data leakage attack may not permit access, may notify that a file being requested does not exist, or that the file being sought by the request is actually a directory. Such responses may indicate an illegitimate file access request because a legitimate request initiated by a human user would likely not request a read of a file that is actually a directory or would not likely request a file for which the name of the file was not known. Thus, a pattern of connecting, reading multiple files, and then disconnecting, in conjunction with one or more status messages 404 that do not comport with a legitimate request to access a legitimate file may indicate above a likelihood threshold that the command sequence 402 comprises a data leakage attack instead of comprising commands to legitimately access files stored at storage 275.

As noted above, one approach to applying different thresholds to different equipment at different times and for different activities, includes the generation of activity profiles 195A-n for different command-issuing equipment in different circumstances. In an example activity profile 195A applied to data manipulating component 270, a system profile can include a threshold for the operation of read 405B command, e.g., to identify when an unusually large number of files are accessed (e.g., read or copied form storage 275 by data manipulation component 270). Similarly, activity profile 195A can include a threshold for the operation that includes a timing parameter, for example if a connect command is followed by a read command that reads, or copies, all files in a directory, and then followed by a disconnect command, a likelihood threshold may be exceeded indicating a data leakage attack has occurred. A timing parameter may comprise a maximum period between receiving of connect, read, and disconnect commands—a human making legitimate requests to read files may take longer to use data manipulation component 270 to connect, then read, and then disconnect than if the data manipulation component is being controlled by data leakage attack malware which may only pause one or two clock cycles, for example, of a processor of the data manipulation between commands. One having skill in the relevant art(s), given the description herein, will appreciate that different commands noted and suggested by descriptions above can have different type of thresholds, e.g., to detect a variety of malware operations.

In an embodiment, in a data leakage attack on stored data 310, a large number of files may be secretly accessed and copied outside of storage device 162. Although not necessarily a pattern of illegitimate activity, such copying of a large number of files may not be typical for a user, or users, of the particular file(s). Patterns of commands that can facilitate the detection of this activity by one or more embodiments include patterns of copying data outside the storage system, e.g., combinations of one or more patterns based on time, number of files, and analysis of the manipulation of a 'flood' (e.g., an excessive amount relative to a normal amount) of files. For example, an SMB2 READ command can be used to read a high volume of files/directories read, e.g., to facilitate a data leakage attack.

Figure 5:
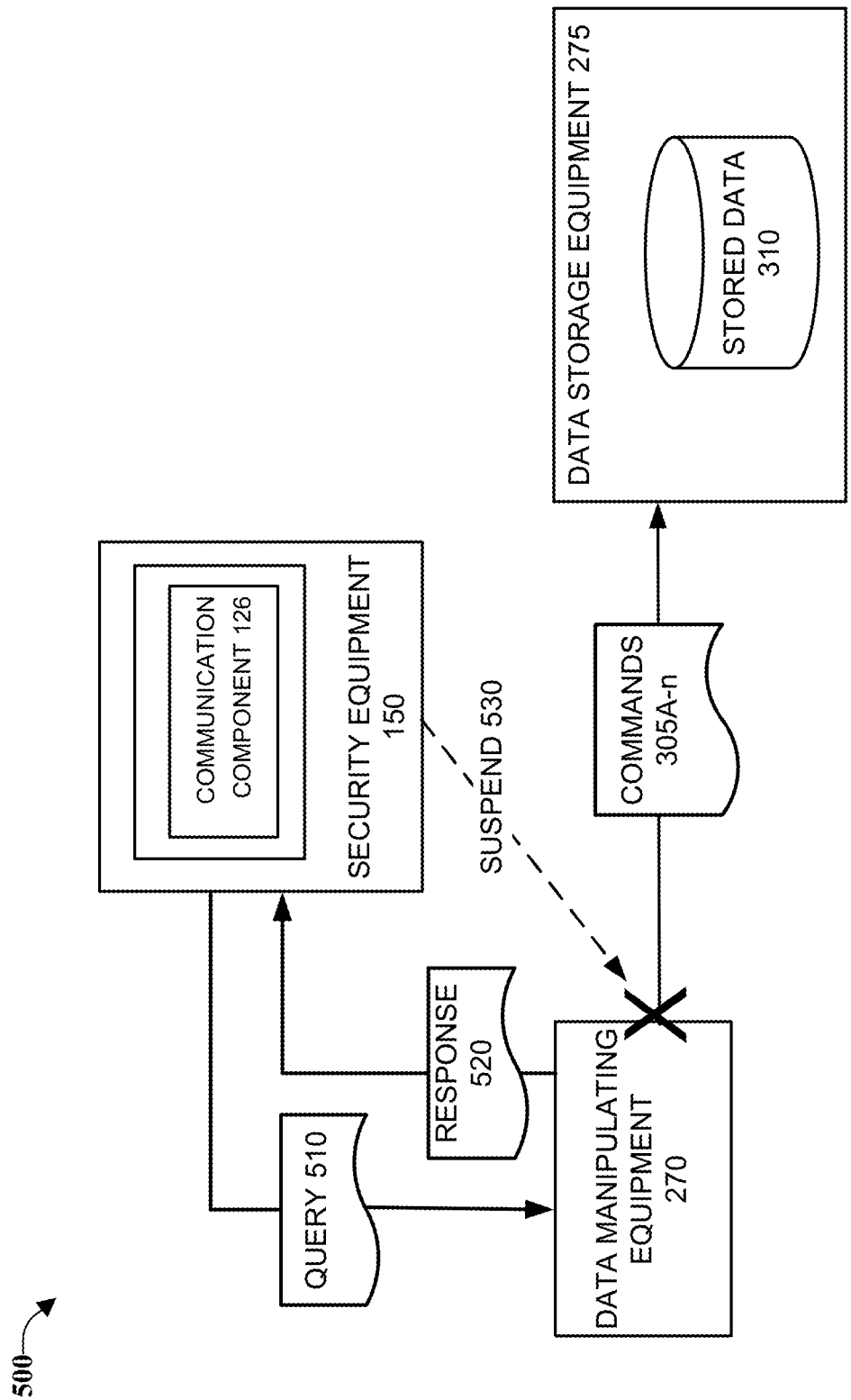
FIG. 5 depicts an architectural diagram that can facilitate monitoring file sharing commands between network equipment to identify adverse conditions, in accordance with one or more embodiments.

FIG. 5 depicts an architectural diagram 500 that can facilitate monitoring file commands between network equipment to identify adverse conditions, in accordance with one or more embodiments. For purposes of brevity, description of like elements and/or processes employed in other embodiments is omitted. As depicted, system 500 includes security equipment 150 monitoring 360 commands 305A-n issued by data manipulating equipment 270 to manipulate stored data 310 stored with data storage equipment 275. In additional details from FIG. 3, security equipment sends query 510 to, and received response 520 from, data manipulating equipment 270. In addition, security equipment 150 is depicted as suspending 530 the issuance of commands from data manipulating equipment 270, or as suspending the acceptance of commands from the data manipulating equipment at network storage 275.

In one or more embodiments, different actions can be performed in response to a determination that a threshold likelihood exists of an adverse condition resulting from monitored sharing commands. As depicted on FIG. 5, in one or more embodiments communication component 126 of security equipment 150 can suspend 530 commands 305A-n from data manipulating equipment 270 as indicated by an 'X' where the commands flow from the data manipulating component 270 to storage 275. It will be appreciated that other approaches can be used to respond to potential adverse events detected, e.g., including but not limited to, blocking commands being processed by data storage equipment 275 or redirecting commands to an alternative destination for analysis. Instead of redirecting commands themselves to be further analyzed, in an embodiment a log of activity relative to storage 275 that exceeds a likelihood threshold be analyzed and flagged as potentially a data leakage attack. If further analysis, of commands, of a access command activity pattern shown in an activity log report, or of other access command activity metrics, results in a determination that activity relative to network storage 275 is activity legitimately requested by a legitimate user of the network storage, access between data manipulating component 270 and network storage 275 may be restored (e.g., the 'X' shown in FIG. 5 at the data manipulating equipment would be removed) by cancelling the suspending 530 of communication between the data manipulating equipment and the network storage.

After an initial response to the adverse event has been performed, one or more embodiments can use query 510 to gather information from data manipulating equipment 270, e.g., to provide notice of the potential attack, and/or to check for a potential false-positive result. In one or more embodiments, response 520 can be provided by an entity in control of manipulating equipment 270 (e.g., a human user or artificial intelligence component) that can provide additional approval information, or a software process issuing the commands at issue can provide an example data underlying the commands.

When considering query 510 as an approach used to mitigate potential false positive results, it should be noted that a baseline of activities and workflow of manipulating equipment 270 may have been used to detect the potential activity. Based on a baseline of activities, one or more embodiments can query workflow processes to determine information that can be a cause of the potential malware activity, e.g., a data leakage attack. In one or more embodiments, analysis, by security equipment 150 of activity and responses 520 of manipulating equipment 270 can reduce the likelihood of defining an event as an adverse event when a metric corresponding to a pattern of activity relative to storage 275 is below the likelihood threshold.

Figure 6:
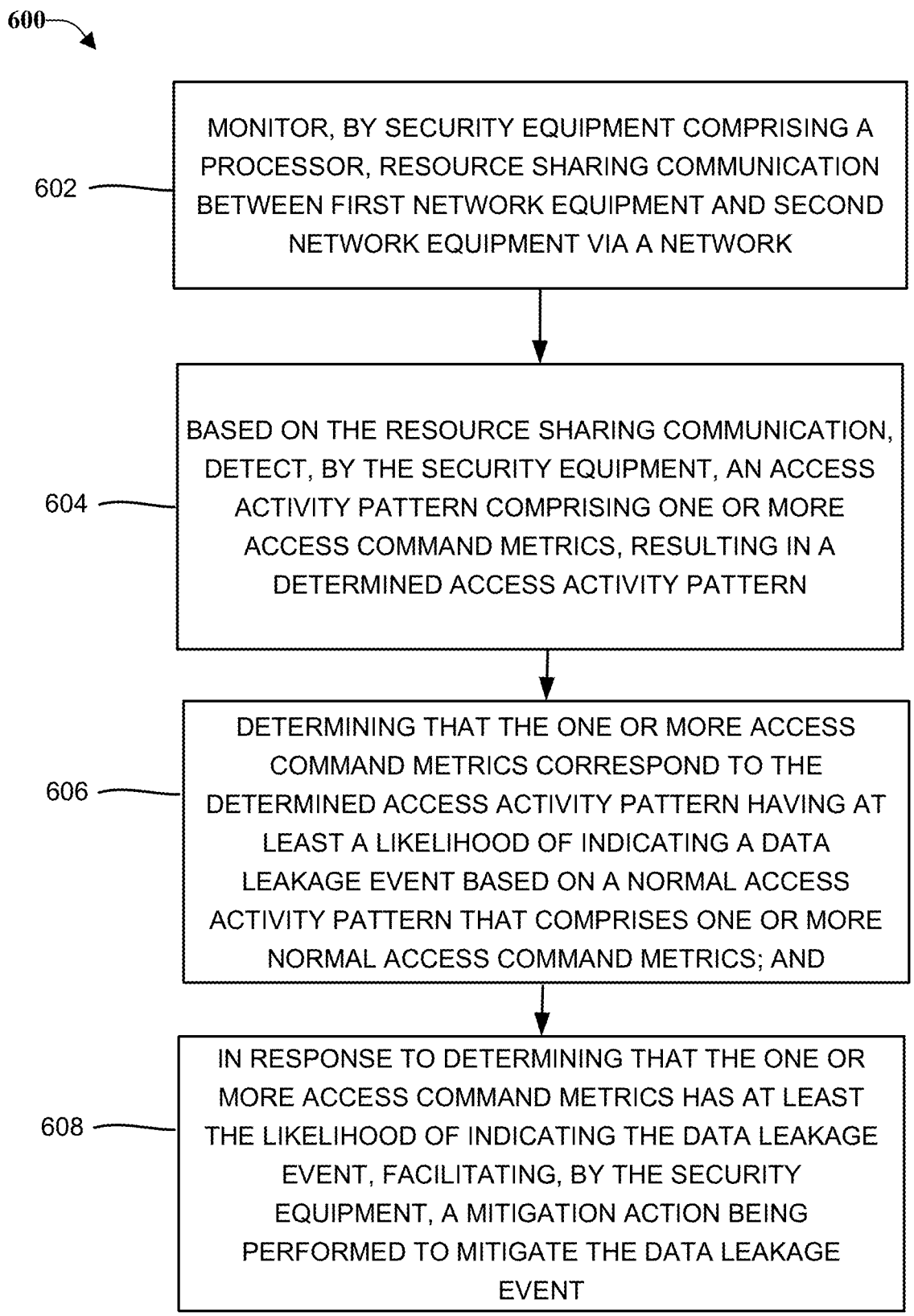
FIG. 6 illustrates an exemplary method embodiment.

FIG. 6 depicts a flow diagram representing example operations of an example method 600 that can facilitate monitoring commands between network equipment to identify adverse conditions, and address an adverse condition, such as a data leakage attack, in accordance with one or more embodiments. For purposes of brevity, description of like elements and/or processes employed in other embodiments is omitted.

In some examples, one or more embodiments of method 600 can be implemented by monitoring component 122, detecting component 124, communication component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

Figure 7:
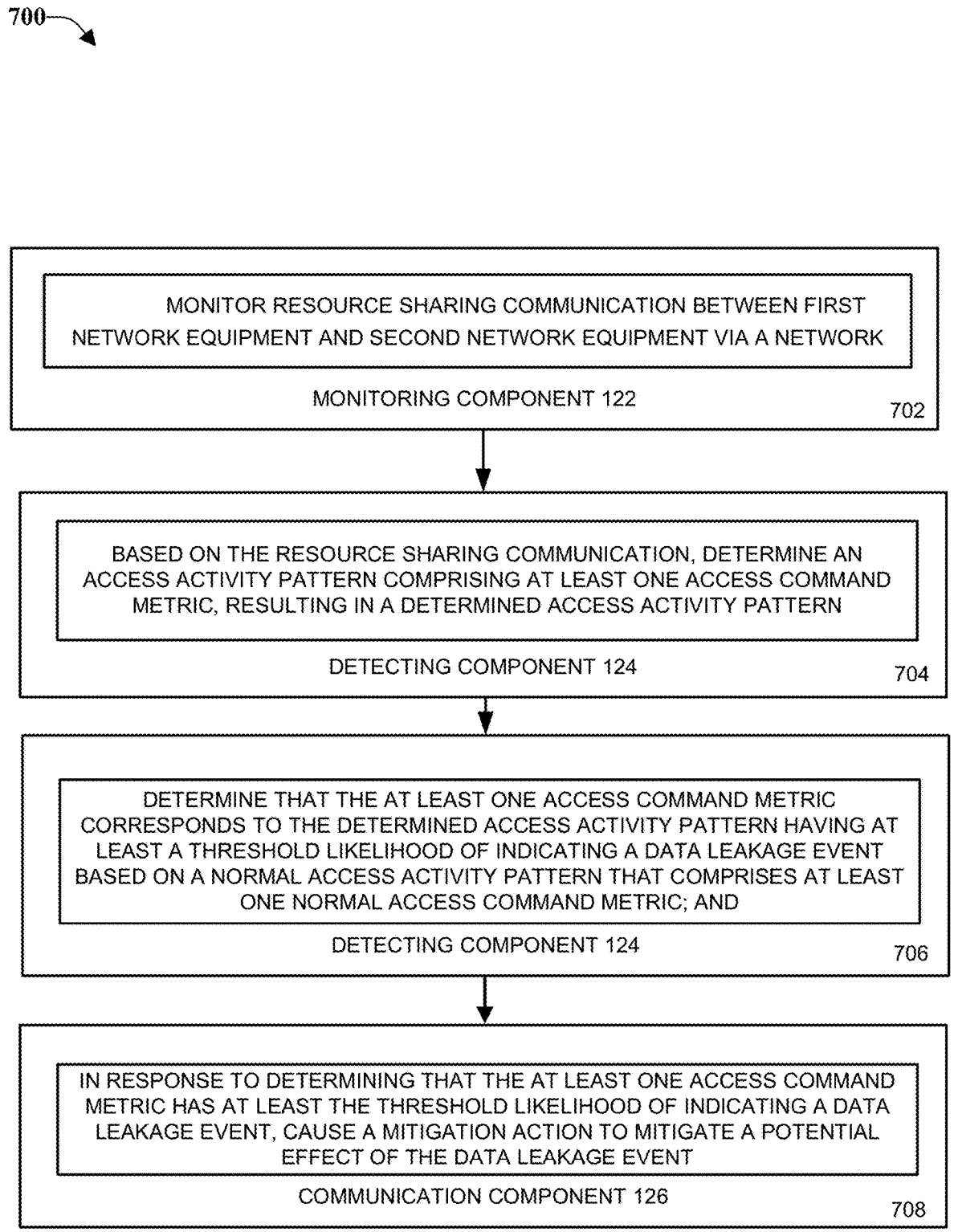
FIG. 7 illustrates an exemplary server system embodiment.

At 602 of method 600, security equipment comprising a processor may monitor resource sharing communication between first network equipment and second network equipment via a network. Resource sharing communication may comprise access commands, such as SMB commands, to connect to a network storage, to read or copy from a network storage, or to disconnect from a network storage. At 604 of method 600, security equipment may, in one or more embodiments, based on the resource sharing communication, determine, by the security equipment, an access activity, or an access activity pattern comprising one or more access command metrics, resulting in a determined access activity, or an access activity pattern. At 606 of method 600, security equipment may, in one or more embodiments, determine that the one or more current, or actual, access command metrics correspond to the determined access activity, or determined access activity pattern having at least a likelihood of indicating a data leakage event based on a normal access activity, or a normal access activity pattern that comprises one or more normal access command metrics; and at step 608 in response to determining that the one or more access command metrics has at least the likelihood of indicating the data leakage event, facilitate, by the security equipment, a mitigation action being performed to mitigate the data leakage event FIG. 7 depicts an example system 700 that can facilitate monitoring file sharing commands between network equipment to identify adverse conditions, in accordance with one or more embodiments. For purposes of brevity, description of like elements and/or processes employed in other embodiments is omitted. Example system 700 may comprise server equipment comprising monitoring component 122, detecting component 124, communication component 126, and other components that can be used to implement aspects of system 700, as described herein, in accordance with one or more embodiments.

At 702 of FIG. 7, server equipment, such as security equipment 150, comprises a processor and a memory comprising executable instructions that, when executed by the processor, facilitate performance of operations, comprising monitoring by monitoring component 122 resource sharing communication between first network equipment and second network equipment via a network. At 704 of FIG. 7, detecting component 124 can, based on the resource sharing communication, determine an access activity pattern comprising at least one access command metric, resulting in a determined access activity pattern. At 706 of FIG. 7, detecting component 124 can, determine that the at least one access command metric corresponds to the determined access activity pattern having at least a threshold likelihood of indicating a data leakage event based on a normal access activity pattern that comprises at least one normal access command metric. At 708 of FIG. 7, communication component 126 can, in response to determining that the at least one access command metric has at least the threshold likelihood of indicating a data leakage event, cause a mitigation action to mitigate a potential effect of the data leakage event.

Figure 8:
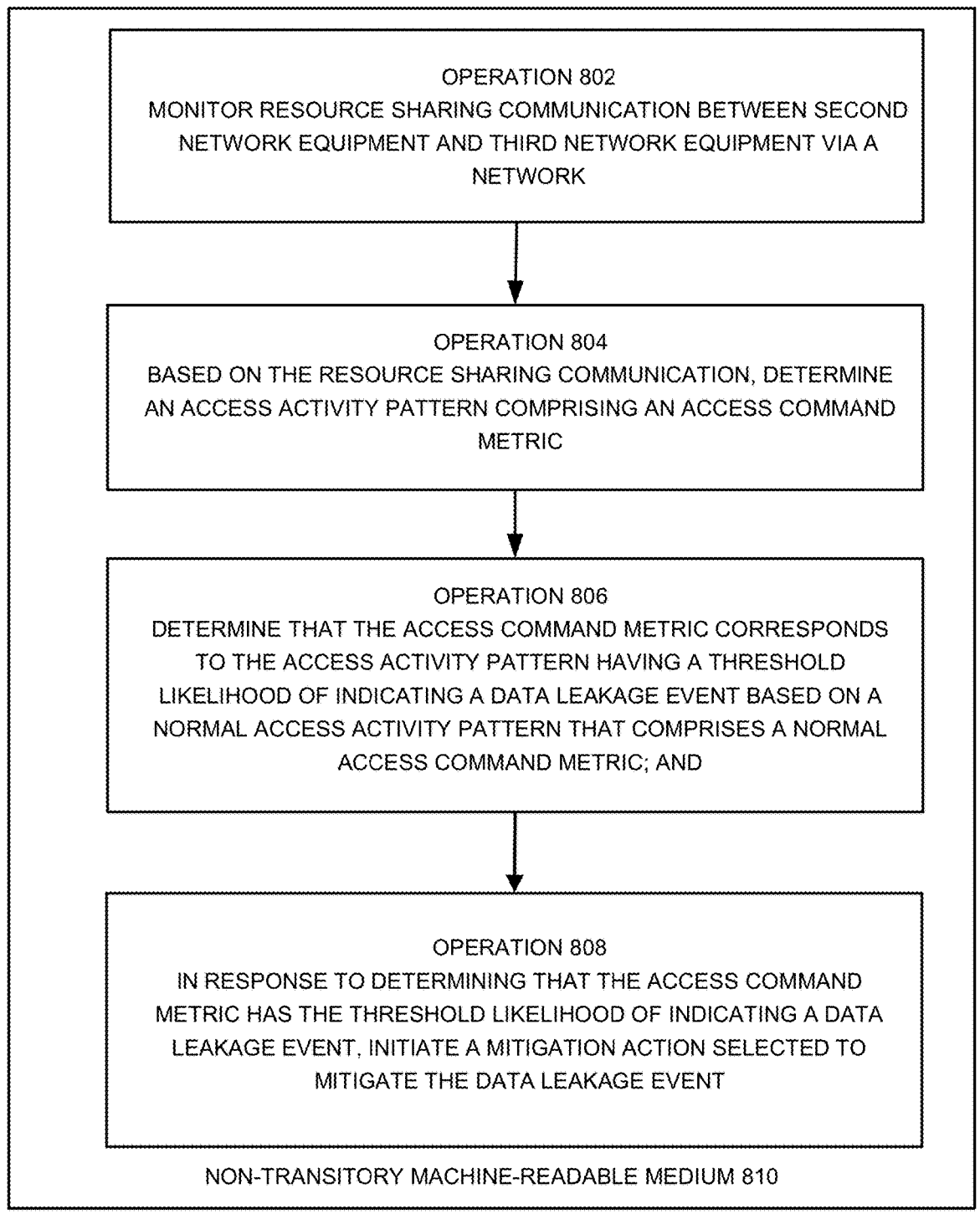
FIG. 8 illustrates an exemplary non-transitory machine-readable medium embodiment.

FIG. 8 depicts an example non-transitory machine-readable medium 800 that can include executable instructions that, when executed by a processor of a system, facilitate monitoring file sharing commands between network equipment to identify adverse conditions, in accordance with one or more embodiments. For purposes of brevity, description of like elements and/or processes employed in other embodiments is omitted.

Operation 802 of FIG. 8 can facilitate generation of monitoring component 122, which, in one or more embodiments, may comprise executable instructions that, when executed by a processor of first network equipment, facilitate performance of operations, comprising can monitor resource sharing communication between second network equipment and third network equipment via a network. The first network equipment may comprise a service corresponding to, and associated with, a network storage. The second network equipment may comprise data manipulating equipment, such as a user computing device that has been infected with malware that comprises instructions to cause a data leakage attack. The third network equipment may comprise a network storage component. The resource sharing communication may comprise a read, a copy, a connect, or a disconnect access command directed to a network storage. Operation 804 of FIG. 8 can facilitate generation of detecting component 124 which, in one or more embodiments, can, based on the resource sharing communication, detect, or determine, an access activity pattern comprising an access command metric. Operation 806 of FIG. 8 can facilitate generation of detecting component 124 which, in one or more embodiments, can, determine that the access command metric corresponds to an access activity, or access activity pattern, having a threshold likelihood of indicating a data leakage event based on a normal access activity, or a normal access activity pattern, that comprises a normal access command metric. Operation 808 of FIG. 8 can facilitate generation of communication component 126 which, in one or more embodiments, can, in response to determining that the access command metric satisfies the threshold likelihood of indicating a data leakage event, initiate a mitigation action selected to mitigate the data leakage event.

Figure 9:
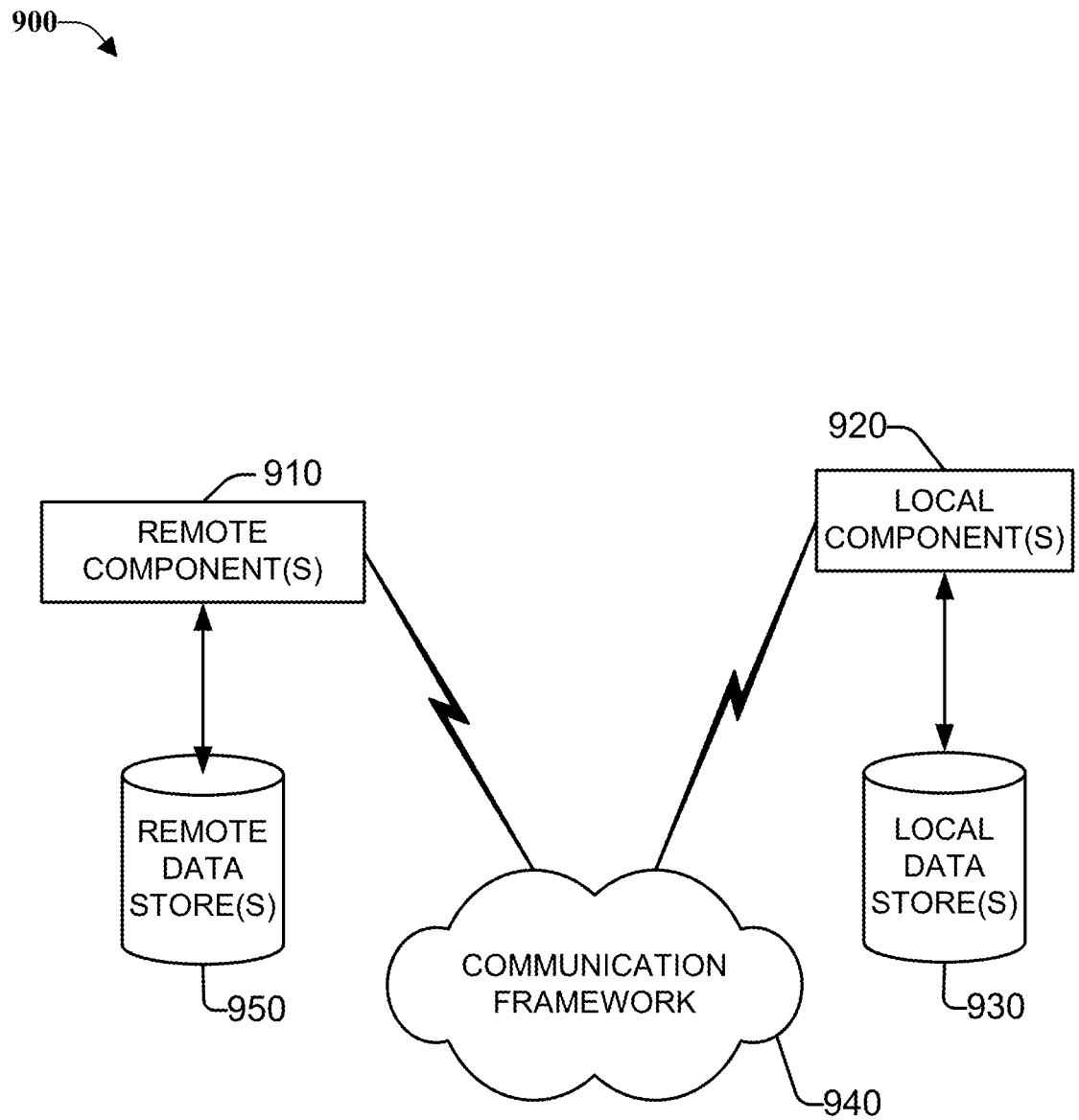
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
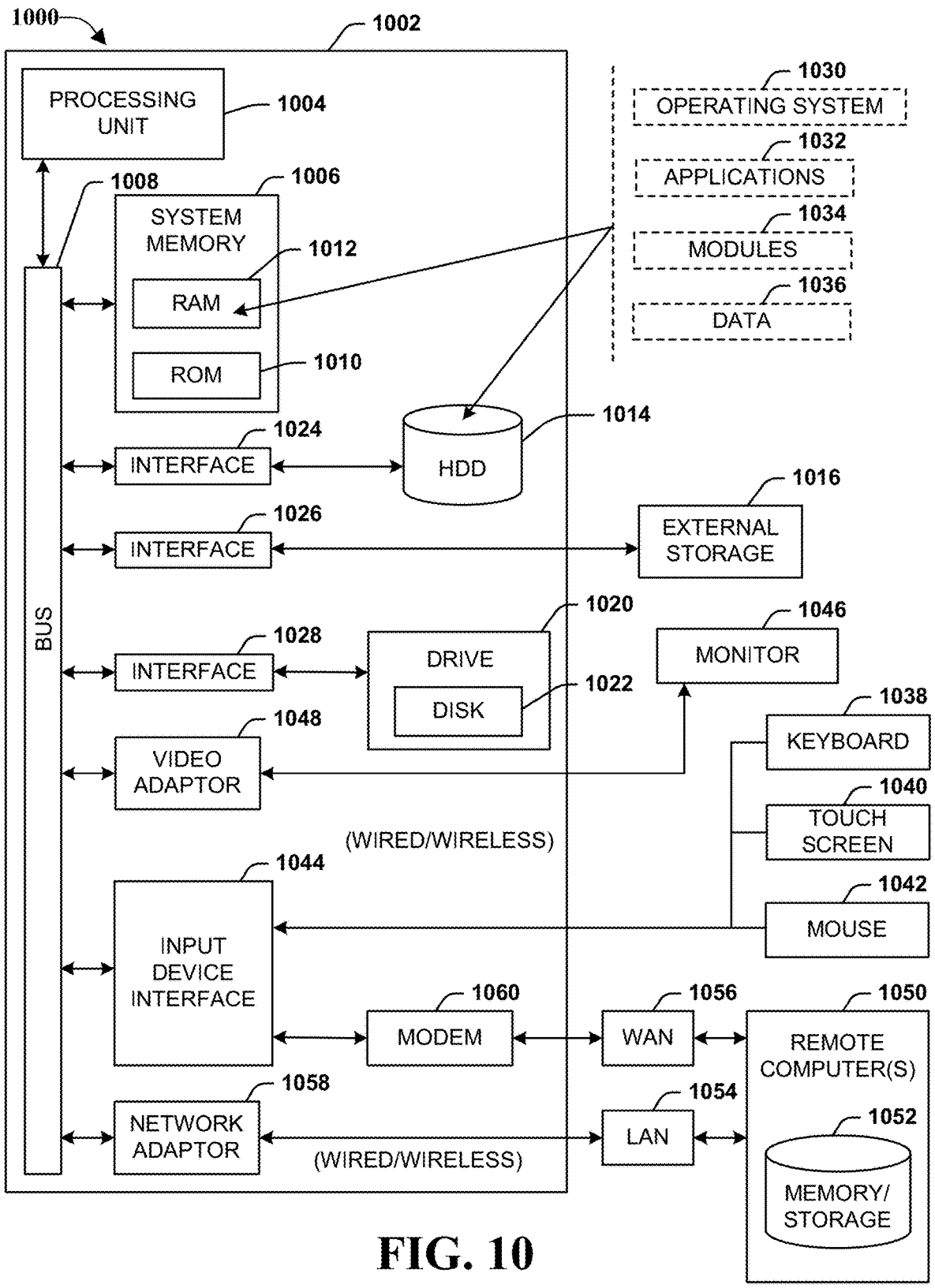
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
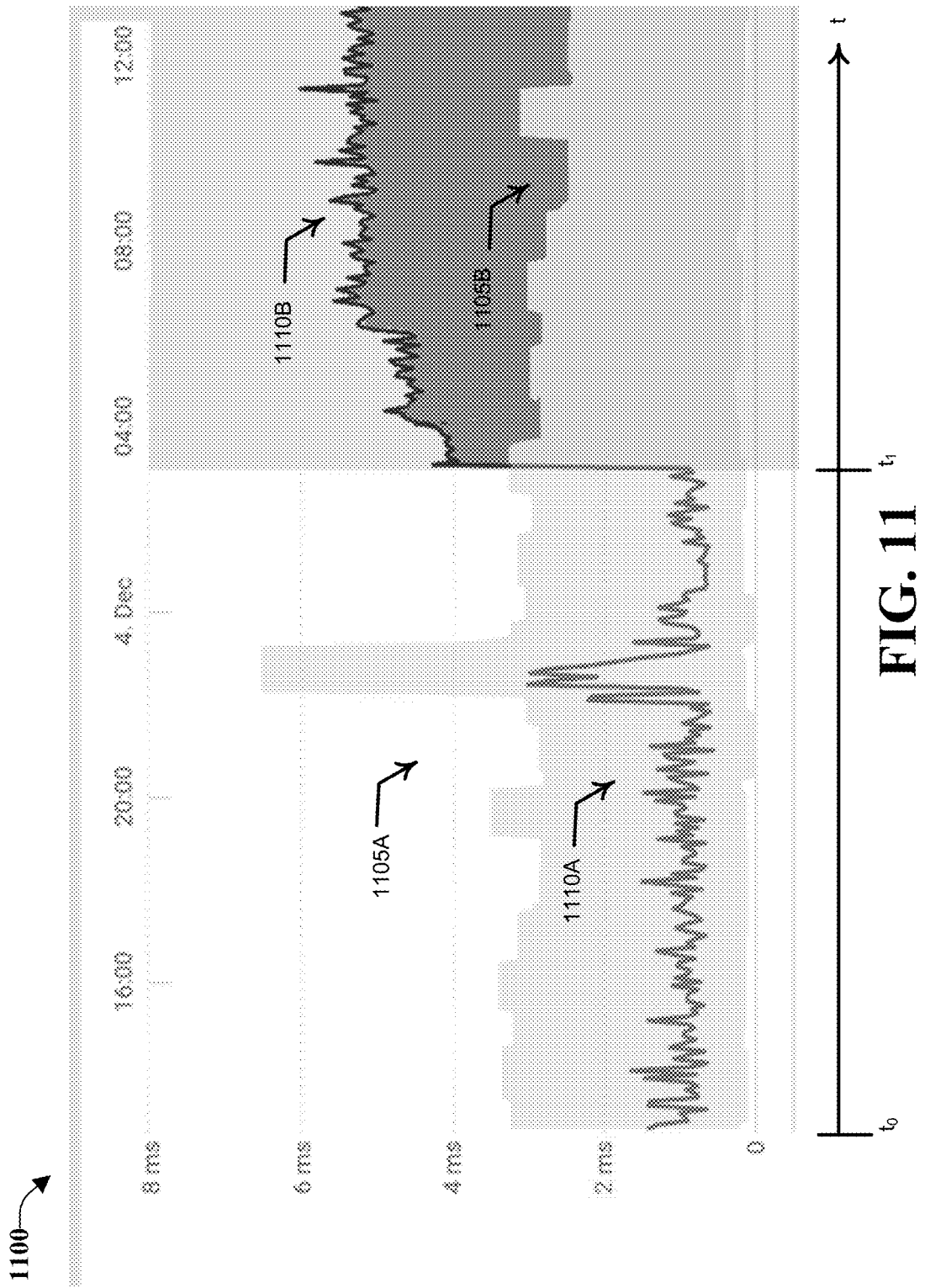
FIG. 11 illustrates a graphic representation of activity corresponding to a storage that may indicate illegitimate data leakage activity.

Turning now to FIG. 11, the figure illustrates a graphical representation 1100 that shows normal access activity pattern 1105 and access activity pattern metrics 1110 during a twenty-four-hour period. Graphical representation 1100 shows a normal access activity pattern 1105A for a period between time $t_0$ and time $t_1$, and a normal access activity pattern 1105B for a period $t_1$ through the end of the twenty-four-hour period of the graphical representation. The vertical axis of representation 1100 is shown as milliseconds. Values on the vertical axis may correspond to an amount of time a network storage is processing access commands, such as connect, read, and disconnect commands. Normal access activity pattern 1105A shows a normal increase in activity before midnight on December 3. In an embodiment, this could correspond to normal maintenance of the network storage at a time when most users that might try to access the storage are typically asleep or not otherwise trying to access the storage. As shown in the figure, normal access activity pattern 1105B has an average normal activity of about the same as during the period before midnight other than the previously mentioned increase in normal activity before midnight. The top of the graphical representation of the normal access activity pattern may be referred to as a likelihood threshold. Actual access activity pattern metrics that exceed the normal access activity pattern at a given time with respect to the horizontal axis may indicate a likelihood of a data leakage attack. Normal access activity pattern 1105 may comprise, or correspond to, one or more access commands, or metrics, such as a read command, a copy command, a connect command, or a disconnect command. In other words, the normal access activity pattern 1105 may indicate a normal amount of processing time a storage spends processing one or more access commands.

Representation 1100 shows that actual access activity pattern metrics 1110A during the first period before $t_1$ are on average about 2 mS below the normal access activity pattern 1105A. Even during the normal increase in access activity before midnight, the actual access metrics do not exceed the corresponding normal access activity pattern before midnight.

However, beginning at time $t_1$, which is about 3:00 AM December 4 as shown in the figure, access command activity metrics 1110B show a marked increase relative to the access activity metrics 1110A and shows an exceeding of the normal access activity pattern 1105B throughout the second period from $t_1$ to the end of the monitored period illustrated in the figure. In an embodiment exceeding the normal access activity pattern 1105B may be an exceeding of a likelihood threshold that indicates that the actual access command activity metrics 1110B likely indicate a data leakage attack. In an embodiment, even if the actual access command activity pattern metrics 1110B do not exceed the normal access activity pattern 1105B, a determination may nevertheless be made that due to the drastic increase in actual access command activity pattern metrics 1110B relative to the actual access command activity pattern metrics 1110A before $t_1$, a data leakage attack is likely indicated.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
monitoring, by security equipment comprising a processor, resource sharing communication between first network equipment and second network equipment via a network;
based on the resource sharing communication, determining, by the security equipment, an access activity pattern comprising one or more access command metrics, resulting in a determined access activity pattern;
determining that the one or more access command metrics correspond to the determined access activity pattern having at least a likelihood of indicating a data leakage event based on a normal access activity pattern that comprises one or more normal access command metrics; and
in response to determining that the one or more access command metrics has at least the likelihood of indicating the data leakage event, facilitating, by the security equipment, a mitigation action being performed to mitigate the data leakage event,
wherein the resource sharing communication comprises one or more commands from the first network equipment to access storage units stored by the second network equipment, and wherein the one or more commands from the first network equipment to the access storage units stored by the second network equipment comprise a connect command followed by a read command followed by a disconnect command, and wherein the one or more access command metrics of the determined access activity pattern comprise copying all files in a directory after the connect command and disconnecting after all of the files in the directory have been copied without other commands from the first network equipment to the access storage units stored by the second network equipment occurring between the connect command and the disconnect command.

2. The method of claim 1, wherein the resource sharing communication comprises communication via a server message block protocol.

3. The method of claim 1, wherein the one or more commands from the first network equipment to the access storage units stored by the second network equipment comprise a COPY command, and wherein the one or more access command metrics of the determined access activity pattern comprise copying a number of files that exceeds, by a selected copied files variance amount, a normal number of files copied during a time of day that a determined access activity associated with the determined access activity pattern occurred.

4. The method of claim 1, wherein the one or more commands from the first network equipment to the access storage units stored by the second network equipment comprise a COPY command, and wherein the one or more access command metrics of the determined access activity pattern comprise copying one or more specific storage units.

5. The method of claim 1, wherein the one or more commands from the first network equipment to the access storage units stored by the second network equipment comprise a COPY command, and wherein the one or more access command metrics of the determined access activity pattern comprise periodically copying, by the first network equipment, storage units from the second network equipment.

6. The method of claim 1, wherein the one or more commands from the first network equipment to the access storage units stored by the second network equipment comprise a TREE_CONNECT command, and wherein the one or more access command metrics of the determined access activity pattern comprise a number of TREE_CONNECT requests, during a selected monitoring period, that exceeds, by a selected TREE_CONNECT request attempt variance amount, a normal number of TREE_CONNECT request attempts during a period having a length of the monitoring period during which a normal number of TREE_CONNECT requests are sent from the first network equipment to the second network equipment.

7. The method of claim 1, wherein the one or more access command metrics of the determined access activity pattern comprise one or more status messages in response to the one or more commands from the first network equipment to the access storage units stored by the second network equipment that indicate an access activity pattern corresponds to behavior other than baseline behavior corresponding to a storage unit.

8. The method of claim 1, wherein the mitigation action comprises at least one of: denying permission to access storage of the access storage units of the second network equipment by the first network equipment, disconnecting the first network equipment from the network, or generating a report for rendering at the second network equipment that the one or more access command metrics have at least the likelihood of indicating the data leakage event.

9. Server equipment, comprising:
at least one processor; and
at least one memory that stores executable instructions that, when executed by the at least one processor, facilitate performance of operations, comprising:
monitor resource sharing communication between first network equipment and second network equipment via a network;
based on the resource sharing communication, determine an access activity pattern comprising at least one access command metric, resulting in a determined access activity pattern;
determine that the at least one access command metric corresponds to the determined access activity pattern having at least a threshold likelihood of indicating a data leakage event based on a normal access activity pattern that comprises at least one normal access command metric; and in response to determining that the at least one access command metric has at least the threshold likelihood of indicating a data leakage event, cause a mitigation action to mitigate a potential effect of the data leakage event, wherein the resource sharing communication comprises at least one command from the first network equipment to access storage units stored by the second network equipment, and wherein the at least one command from the first network equipment to access storage units by the second network equipment comprises a connect command followed by a read command followed by a disconnect command, wherein the at least one access command metric of the determined access activity pattern comprises copying all files in a directory after the connect command and disconnecting after all of the files in the directory have been copied without other commands from the first network equipment to access storage units stored by the second network equipment occurring between the connect command and the disconnect command.

10. The server equipment of claim 9, wherein the resource sharing communication comprises communication via a server message block protocol.

11. The server equipment of claim 9, wherein the mitigation action comprises disconnecting the first network equipment from the network.

12. The server equipment of claim 9, wherein the mitigation action comprises providing a user report to the second network equipment indicating that the at least one access command metric has at least the threshold likelihood of indicating the data leakage event.

13. The server equipment of claim 9, wherein the at least one access command metric of the determined access activity pattern comprises at least one status message in response to the at least one command from the first network equipment to access storage units stored by the second network equipment that indicate an access activity pattern corresponds to behavior other than baseline behavior corresponding to a storage unit.

14. The server equipment of claim 9, wherein the mitigation action comprises denying permission to access storage of the second network equipment by the first network equipment.

15. A non-transitory machine-readable medium, comprising executable instructions that, when executed by at least one processor of first network equipment, facilitate performance of operations, comprising:

monitor resource sharing communication between second network equipment and third network equipment via a network;

based on the resource sharing communication, determine an access activity pattern comprising an access command metric;

determine that the access command metric corresponds to the access activity pattern having a threshold likelihood of indicating a data leakage event based on a normal access activity pattern that comprises a normal access command metric; and in response to determining that the access command metric has the threshold likelihood of indicating a data leakage event, initiate a mitigation action selected to mitigate the data leakage event, wherein the at least one access command metric corresponds to copying all files in at least one storage unit after a connect command and disconnecting after all of the files in the at least one storage unit have been copied without other commands to access the at least one storage unit occurring between the connect command and the disconnect command.

16. The non-transitory machine-readable medium of claim 15, wherein the resource sharing communication comprises a command from the second network equipment to access the at least one storage unit stored by the third network equipment.

17. The non-transitory machine-readable medium of claim 15, wherein the resource sharing communication comprises communication via a server message block protocol.

18. The non-transitory machine-readable medium of claim 15, wherein the mitigation action comprises denying permission to access storage of the third network equipment by the second network equipment.

19. The non-transitory machine-readable medium of claim 15, wherein the mitigation action comprises disconnecting the second network equipment from the network.

20. The non-transitory machine-readable medium of claim 15, wherein the mitigation action comprises sending a report to the third network equipment to indicate to a user associated with the third network equipment that the access command metric has the threshold likelihood of indicating the data leakage event.

\* \* \* \* \*